(12) United States Patent
Chen et al.

(10) Patent No.: US 6,417,631 B1
(45) Date of Patent: Jul. 9, 2002

(54) INTEGRATED BRIDGE INVERTER CIRCUIT FOR DISCHARGE LIGHTING

(75) Inventors: Timothy Chen, Germantown, TN (US); Louis R. Nerone, Brecksville; James K. Skully, Willoughby, both of OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/778,337

(22) Filed: Feb. 7, 2001

(51) Int. Cl.[7] ................................................ G05F 1/00
(52) U.S. Cl. ................... 315/291; 315/224; 315/209 R; 315/200 R; 315/307
(58) Field of Search ........................... 315/291, 200 R, 315/209 R, 224, 225, 246, 247, 307

(56) References Cited

U.S. PATENT DOCUMENTS

| 5,400,241 | A | * | 3/1995 | Bergervoet | 363/132 |
|---|---|---|---|---|---|
| 5,426,344 | A | | 6/1995 | Wong et al. | 315/200 R |
| 5,898,278 | A | * | 4/1999 | Muessli | 315/209 R |
| 6,169,374 | B1 | * | 1/2001 | Chang | 315/224 |
| 6,184,630 | B1 | * | 2/2001 | Qian et al. | 315/224 |
| 6,208,085 | B1 | * | 3/2001 | Lehnert et al. | 315/247 |

* cited by examiner

Primary Examiner—Don Wong
Assistant Examiner—Tuyet T. Vo
(74) Attorney, Agent, or Firm—Fay, Sharpe, Fagan, Minnich & McKee, LLP

(57) ABSTRACT

A ballast, powered by a power source is used to control operation of a load such as a discharge lamp. The ballast includes a switching network configured to control a supply of power to the load, and a bridge converter network which is configured to receive an input signal from the power source and convert it into a form useable by the switching network. The bridge converter network is integrated into the switching network.

11 Claims, 4 Drawing Sheets

INTEGRATED BRIDGE INVERTER CIRCUIT FOR DISCHARGE LIGHTING

BACKGROUND OF THE INVENTION

The present invention is directed to electronic lighting systems, and more particularly to an integrated bridge inverter circuit used in connection with a discharge lamp.

Existing single-stage high-power factor electronic ballasts designed for discharge lamps, such as integral compact fluorescent lamp applications have various drawbacks including an undesirably limited zero-voltage switching range, a high unnecessary component stress during operation and starting. Existing systems also have undesirably high crest factors and high harmonics' content, which prevents product from compliance with International Electrotechnical Commission (e.g. IEC-61000-3-2) standards.

One existing electronic ballast which may be used for discharge lamps is shown for example, by Wong, U.S. Pat. No. 5,426,344. Wong discloses a self-oscillating high-power factor electronic ballast. The disclosed Wong circuit, as well as other existing ballasts, use input bridge circuit portions and inverter circuit portions which are distinct and separate from each other. The approach proposed in Wong et al. has a crest factor of 2.0 or higher, with high bus-voltage stresses, such as the voltage across C3, which in turn requires high voltage-rated transistors. A further disadvantage of this approach is a need to use of large EMI filter due to a discontinuous nature of the input current existing prior to the input bridge D1. The high-peak currents, which have higher high frequency current content, need to be filtered out by the input EMI filter. Therefore, yet a further disadvantage of existing ballasts such as Wong et al., is a high current stress on the switch transistors and resonant components.

To overcome shortcomings of existing prior art ballasts it has been deemed desirable to develop a ballast having a high power factor, low total harmonic distortion, and yet having an extended zero-voltage switching range, low cost, and low component stresses.

BRIEF SUMMARY OF THE INVENTION

A ballast, powered by a power source is used to control operation of a load such as a discharge lamp. The ballast includes a switching network configured to control a supply of power to the load, and a bridge converter network which is configured to receive an input signal from the power source and convert it into a form useable by the switching network. The bridge converter network is integrated into the switching network.

DETAILED DESCRIPTION OF THE INVENTION

Figure 1:
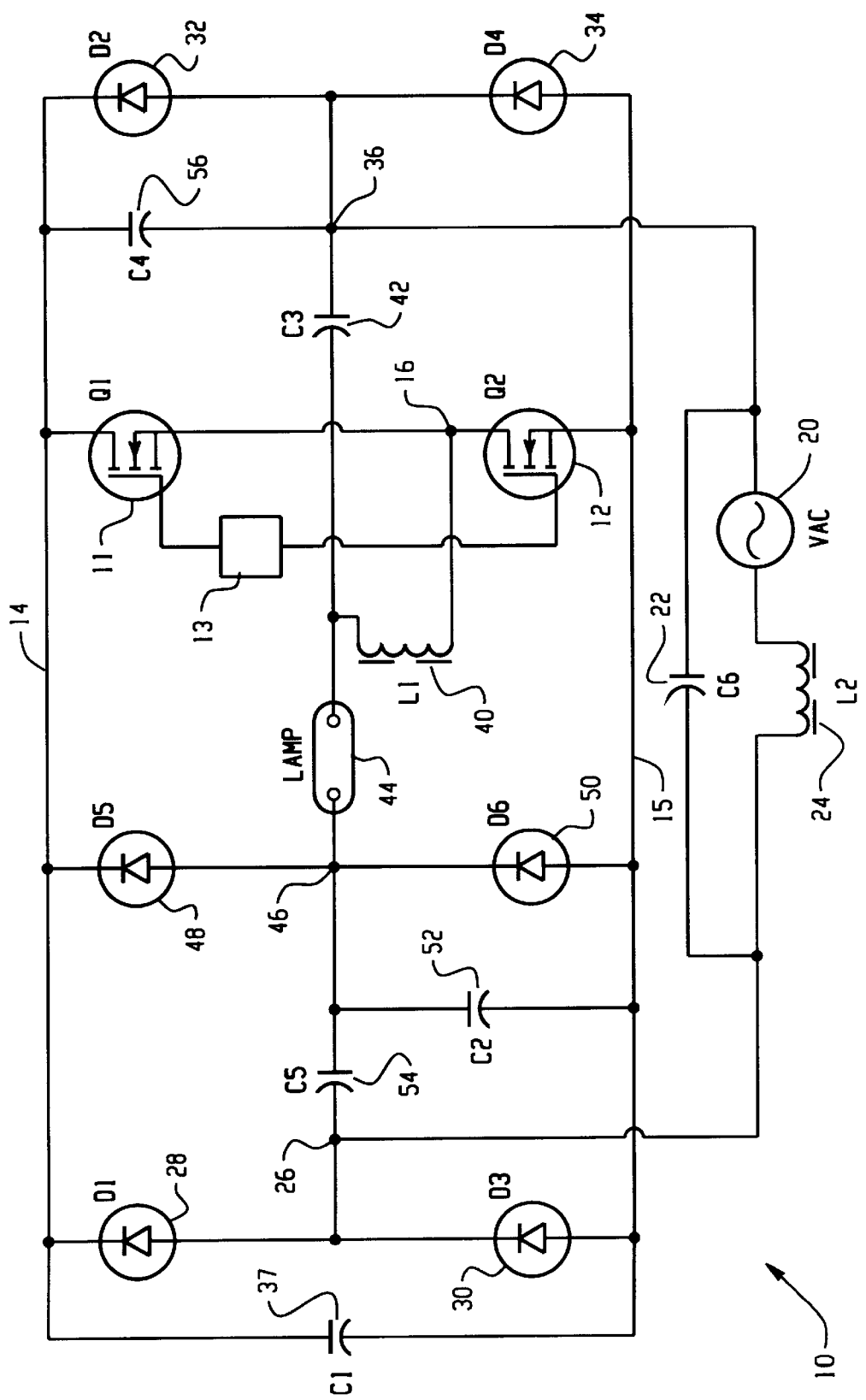
FIG. 1 illustrates a first embodiment of the present invention.

Turning to FIG. 1, illustrated is a first embodiment of a ballast lighting circuit 10 configured according to the concepts of the present invention. A half-bridge switching converter circuit including switches 11 and 12 is driven by driving circuit 13 which may be either a self-oscillating or an integrated circuit (IC) arrangement. Both such arrangements are known in the art and therefore are not discussed in detail. In FIG. 1, switches 11 and 12 are n-channel MOSFETS, with a drain of switch 11 connected to positive voltage bus 14, the source of switch 12 connected to ground reference bus 15, and the source of switch 11 and drain of switch 12 connected at node 16. In alternative embodiments switches 11 and 12 may be other types of transistors or controllable switches.

An A.C. power source 20, which may be a wall outlet or other power source, is connected to an electromagnetic interference (emi) filter configuration formed by emi capacitor 22 and emi inductor 24. Power source 20 is then connected on one side to node 26 between diode 28 and diode 30 of a diode bridge also including diodes 32 and 34. An opposite side of power source 20 is attached at node 36, between diode 32 and diode 34 of the diode converter bridge. A main energy storage capacitor, such as electrolytic capacitor 37, is connected across diodes 28 and 30.

Node 16, located between switch 11 and switch 12, also serves as a connection point for one end of resonant inductor 40, where a second end of resonant inductor 40 is attached to resonant capacitor 42. The other end of resonant capacitor 42 is in turn connected to node 36 between diodes 32 and 34. A further connection of resonant inductor 40 is to a discharge lamp 44, such as a compact fluorescent lamp (CFL), a linear fluorescent lamp, a HID lamp, or other appropriate lamp type. A second end of discharge lamp 44 is attached at node 46, which is the junction between clamping diodes 48 and 50, whose opposite ends are connected to circuit buses 14 and 15. Additional design of circuit 10, includes a resonant capacitor 52 placed in parallel with diode 50, a resonant capacitor 54 connected between nodes 26 and 46, and a capacitor 56 connected in parallel to diode 32.

A factor which differentiates circuit 10 from existing high frequency electronic ballasts, is elimination of the separation between the input circuit and the bridge circuit. For example, Wong et al. teaches an emi input filter circuit (L1, C1, C2) followed by a separate distinct full-bridge circuit (D1). In the present invention, diodes 28, 30, 32 and 34 are part of the bridge circuit and have also been integrated into the switching inverter circuit. Therefore, unlike existing electronic ballasts, bridge circuit 28–34 does not simply rectify input but is part of the inverter circuit driving switches 11,12. Particularly, inverter circuit components are connected to the bridge circuit as well as the input power circuit components.

The topology of FIG. 1 provides several benefits including a high-power factor, which is in the range of 99%, with total harmonic distortion (THD) lowered to approximately 5%. Electronic ballast 10 therefore ensures the meeting of existing IEC standards such as IEC-61000-3-2 for harmonic distortion. Also, the crest factor obtained by circuit 10 is approximately 1.7, and it also minimizes the current stress to switches 11, 12 and resonant inductor 40. Circuit 10, permits an input current having a lower high frequency content than existing electronic ballasts, which reduces the stress on and size of emi filters 22,24. The present circuit is also capable of functioning with a bus voltage lower than that used for operating existing two stage electronic ballasts. Particularly, in the present embodiment the bus voltage used is substantially the peak of the input voltage.

During operation of circuit 10, diodes 48 and 50, connected to the second end of discharge lamp 44 at node 46, act to clamp the voltage at that end of lamp 44 to the bus voltage. Therefore, a squarewave, with a DC bias, signal is essentially created at junction 46. The described squarewave is a high frequency A.C. waveform and is applied to capacitor 54. This causes the current through capacitor 54 to force diode 28 and diode 34 to be alternatively conducting (assuming operation is on the positive half-cycle; on the negative half cycle, diodes 30, 32 will be alternatively conducting). The current from capacitor 54 becomes part of the input A.C. current, since diodes 48 and 50 are clamped to buses 14 and 15, and the other end of capacitor 54 is connected to node 26 from input source 20.

Figure 2:
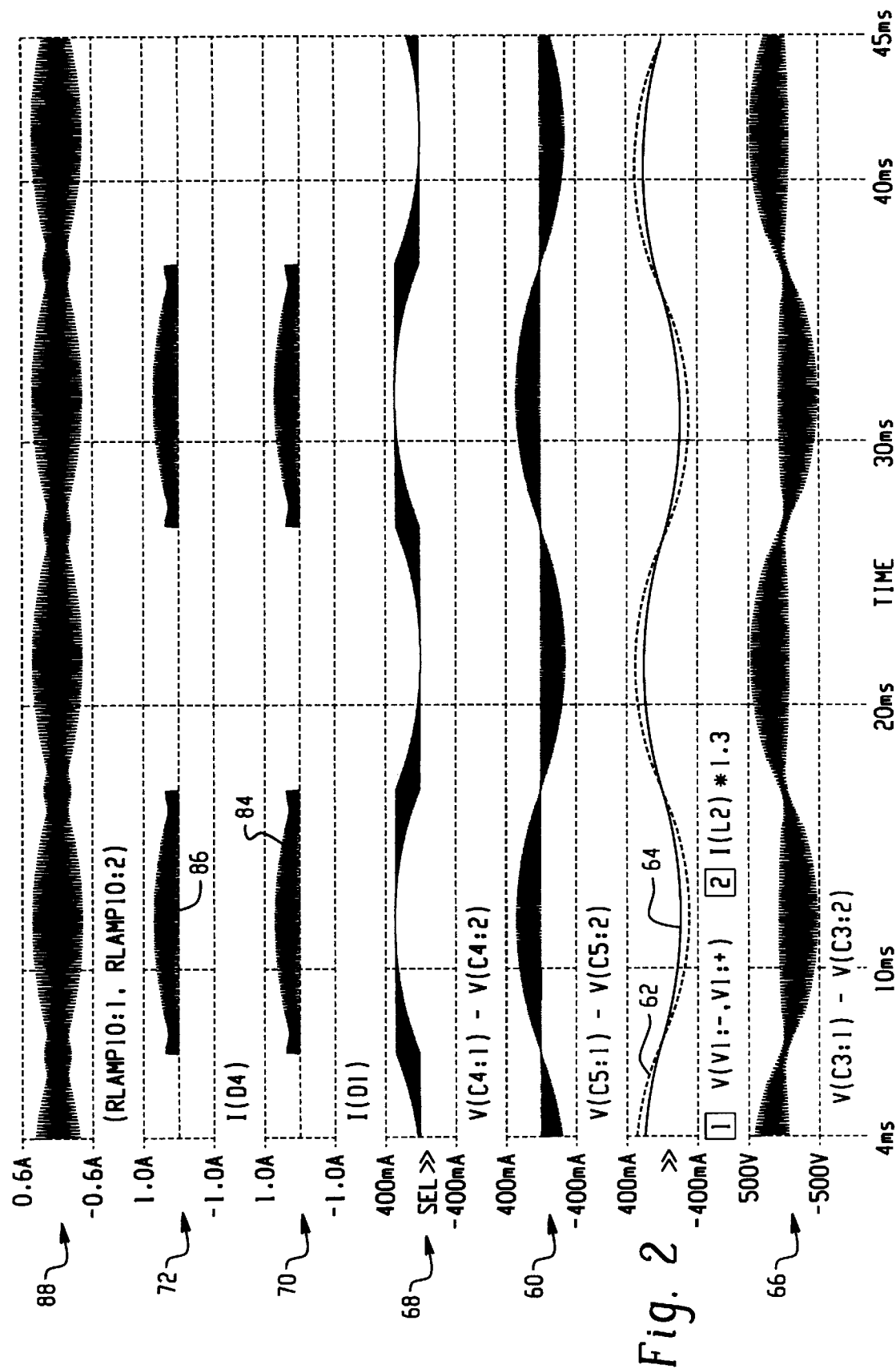
FIG. 2 sets forth various waveforms obtained by operation of the present invention.

Turning to FIG. 2, and with continuing attention to FIG. 1, illustrated is waveform 60 representing the voltage across capacitor 54. Waveform 60 is a high frequency envelope waveform, where the envelope is almost sinusoidal. This low-frequency sinusoidal waveform substantially matches A.C. power source voltage waveform 62. The emi filters 22, 24 act to filter out high-frequency signal portions and this remaining portion of waveform 60 becomes part of overall input current 64, which is substantially in-phase with input voltage waveform 62. Thus, the current through capacitor 54 is part of the overall input current waveform 64.

Turning to waveform 66 (FIG. 2) which represents the voltage across capacitor 42, it can be seen that the waveform shape has similarities, but it is not exactly the same as waveform shape 60 across capacitor 54. A difference between the voltage waveform 60 (capacitor 54) and waveform 66 (capacitor 42), is that the voltage across capacitor 42 has a more substantial offset from the zero crossover voltage, which indicates a voltage bias being generated across capacitor 42. This bias across capacitor 42, can cause distortion of the input current 64.

To avoid this situation, circuit 10 implements capacitor 56. The operation of capacitor 56 is illustrated by reviewing voltage waveform 68 (FIG. 2) which represents the voltage across capacitor 56. Waveform 68 is substantially representative of the bus waveform minus the input voltage source waveform 62. Since capacitor 42, with the bias voltage, and capacitor 56, are both connected at node 36, the current through capacitor 56 is used to lower the current from capacitor 42 in order to reduce the current distortion in the input line current. As a result of the interaction between capacitors 42 and 56, the sum of the current from capacitor 42, capacitor 56 and capacitor 54 result in the preferred input current 64 of FIG. 2.

A review of waveform 62 (which is the input voltage) and waveform 64 (which is the input current) illustrates that these waveforms are in-phase and of substantially the same shape, which verifies that circuit 10 has a high power factor and low THD.

Capacitor 52, which is in parallel with diode 50, provides a return path for a portion of current from lamp 44. By this design, capacitor 52 ensures there is not an oversupply of current to the lamp, so a proper power balance between the power delivered to lamp 44 and power coming from power source 20 is obtained. This power balance is achieved by a ratio between the values of capacitor 52 and capacitor 54.

As noted, the relationship between capacitor 42 and capacitor 56 is such that a canceling between these two components exist. To ensure proper canceling in desired situations, for example where the lamp current crest factor is to be less than 1.7, the following approximation may be used:

$$C_{56} \cong 2.5 \cdot \frac{V_l \cdot C_{42}}{V_{in\,max} \cdot ICF},$$

where $C_{56}$ is capacitor 56, $V_1$ is RMS of the lamp voltage, $C_{42}$ is capacitor 42, $V_{inmax}$ is line peak voltage, and ICF is the current crest factor.

Turning to the relationship between capacitors 42, 54 and 56, the relationship between these capacitors to obtain desired output is:

$$(C_{42} + C_{54} + C_{56}) = \frac{P_{in}}{V_{in}^2 \cdot fs},$$

where $C_{42}$ is capacitor 42, $C_{54}$ is capacitor 54, $C_{56}$ is capacitor 56, $P_{in}$ is the input power, $V_{in}^2$ is the input RMS voltage squared, and fs is the switching frequency. The selection of switching frequency can indirectly determine the size of the C42, C54 & C56 and transformer. Also, there should be a tradeoff consideration for the size of the resonant components VS. EMI and RFI of a product.

Since capacitors 42 and 54 are connected back to voltage power source 20, the voltage across capacitors 42 and 54 are modulated by the input power source 20, so the equivalent capacitor to the resonant tank is changed due to the modulation of the voltage across capacitor 42. Therefore, to do the analysis or design of such a circuit as circuit 10, it is possible to consider a modulation effect on a capacitor over the entire line cycle by using an equivalent capacitor value.

Over a line cycle, the effective value of capacitor on the tank circuit is changed so it becomes desirable to find what is an equivalent capacitor over the entire line cycle. The following equation finds such an equivalent capacitor for capacitor 42:

$$C_{42equ} = 2 \cdot \left[\frac{C_{42}}{\pi}\right] + C_{42} \cdot 2 \cdot \frac{V_l}{V_l + V_{in\,max}},$$

the equation for the equivalent capacitor 52 is:

$$C_{54equ} = \frac{2 \cdot C_{54}}{\pi}$$

A reason circuit 10 has a small amount of high-frequency current ripple in the line, compared to existing electronic ballasts, is due to the connection of one end of each of capacitor 42 and capacitor 54 to both sides of the input power source 20, at nodes 26 and 36. As a result of this, the currents through capacitors 42 and 54 are out of phase, which reducing peak current. Therefore, instead of having a very high peak current with a low duty ratio, the input current has lower peak current with a larger duty ratio.

Figure 3:
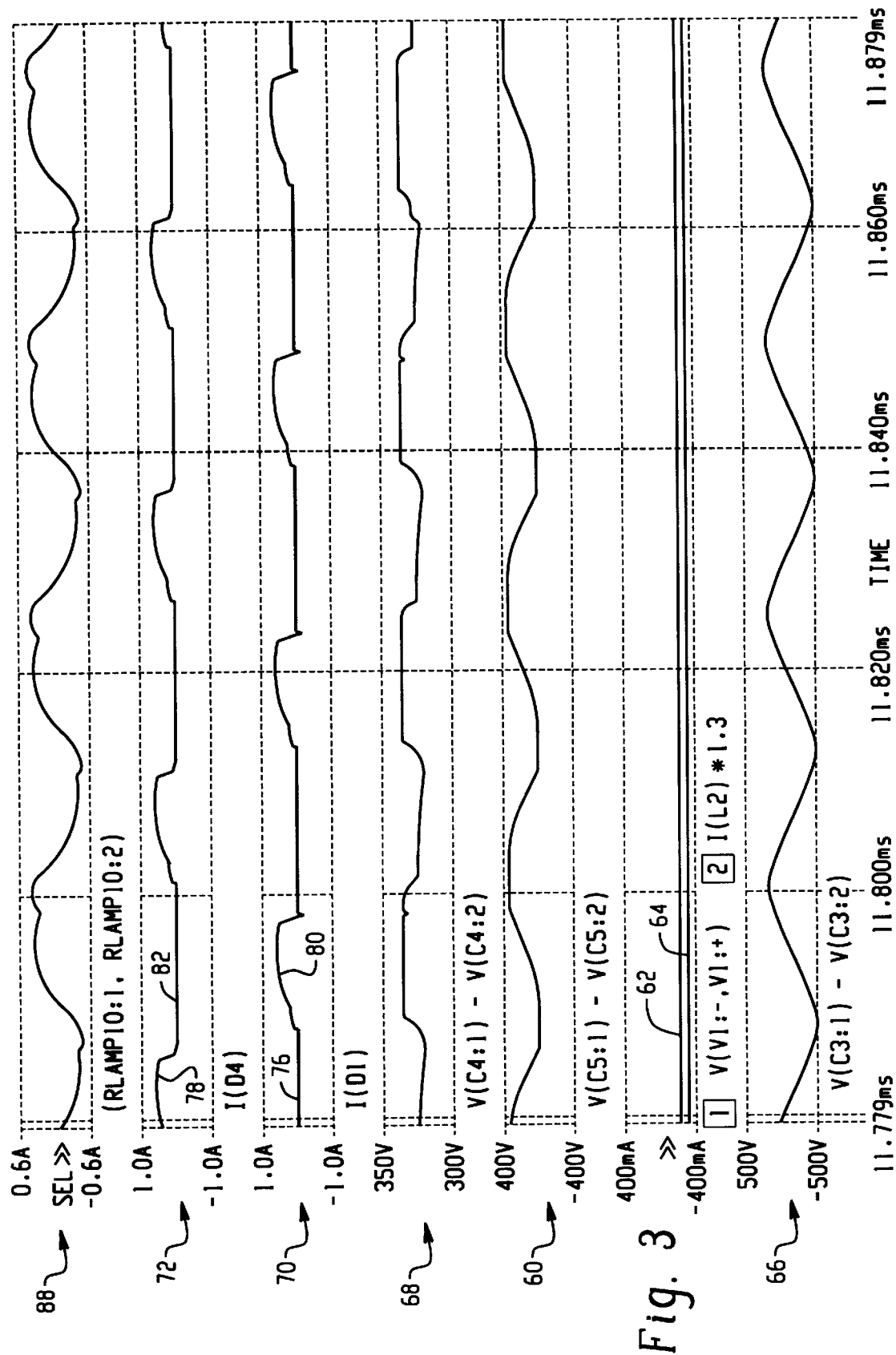
FIG. 3 depicts the wave forms of FIG. 2 with an expanded time axis.

Turning back to FIG. 2, waveforms 60–68 have been previously discussed. Waveform 70 is the current across switching diode 28 and waveform 72 illustrates the current waveform across switching diode 34. As can be seen, by looking at the envelopes of these waveforms, high-frequency switching is taking place, where diodes 28 and 34 are alternatively active. Therefore, the two diodes do not conduct at the same time. This can be seen more clearly in FIG. 3, which depicts expanded timelines of waveforms including waveforms 70 and 72. For example, in a first time period, diode 28 is not conducting during waveform portion 76 of waveform 70 while diode 34 is conducting during waveform portion 78 of waveform 72. In a transition, diode 28 turns on at portion 80, and diode 34 turns off at portion 82. These changes are occurring in the conducting envelope portions 84 and 86 of FIG. 2.

Lastly, with regard to FIG. 2, current waveform 88 depicts the lamp arc waveform 44, and illustrates a low crest factor obtained without large peak current. The remaining waveforms of FIG. 3 offer expanded versions of waveforms 60–68 and 84.

Figure 4:
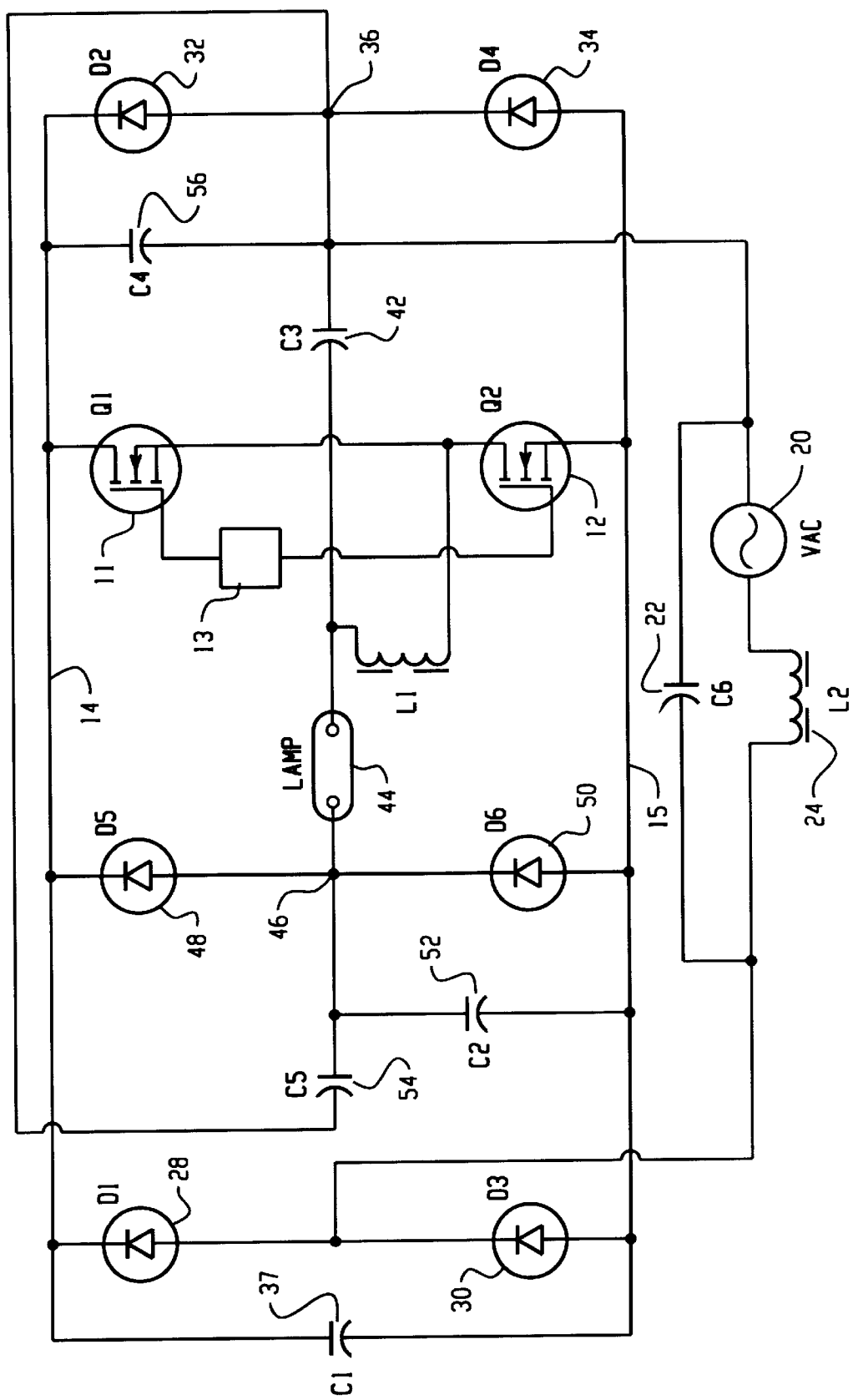
FIG. 4 shows a second embodiment of the present invention.

FIG. 4, sets forth a second embodiment of a ballast lighting circuit 90 of the present invention. Components which are the same as that shown in FIG. 1 are similarly numbered. In this embodiment, a change is that both capacitor 42 and capacitor 54 are tied to the same side of power source 20. In this embodiment the connection of capacitor 54 at node 26 is removed and this end of capacitor 54 is tied to node 36. It is to be appreciated that in a further embodiment rather than having capacitor 54 tied to node 36, capacitor 42 may be tied to node 26 of FIG. 1. Under this embodiment the side of capacitor 42 connected to node 36 would be removed and capacitor 42 along with capacitor 54 would be connected to node 26.

In either of these arrangements, the high frequency ripple on the lines will be higher than in the first embodiment of FIG. 1 as current through capacitor 42 and capacitor 54 will be in phase. In this case, it would be required to have larger emi filters 22, 24 than would be used in the embodiment of FIG. 1.

In one embodiment, the component values for a circuit such as described in connection with embodiments 1 and 2 of the present invention include:

Transistor Switch (Q1) 11 . . . IRF214
Transistor Switch (Q2) 12 . . . IRF214
Input Source (VAC) 20 . . . 120Vac
EMI Capacitor (C6) 22 . . . 0.22uF
EMI Inductor (L2) 24 . . . 2mH
Bridge Diodes (D1–D4) 28–34 . . . 1N4937
Energy Storage Capacitor (C1) 37 . . . 47uF
First Inductor (L1) 40 . . . 0.7mH
Divider Capacitor (C3) 42 . . . 3.3nF
Bridge Diodes (D5–D6) 48–50 . . . 1N4937
Parallel Capacitor (C2) 52 . . . 1nF
Capacitor (C5) 54 . . . 16.8nF
Parallel Capacitor (C4) 56 . . . .1.3nF While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An electronic ballast circuit, powered by an input to control a load, the electronic ballast circuit comprising:
    an emi filter configuration connected to the power source;
    a series connected switching network connected to a first bus and a second bus;
    a bridge inverter network having a first leg including first and second series connected bridge diodes and a second leg including third and fourth series connected bridge diodes, each leg connected to the first bus and the second bus;
    an energy storage capacitor connected across the first leg of bridge switching diodes;
    a first inductor connected between the switching network and one end of the load;
    a first capacitor network having a first capacitor and a second capacitor, the first capacitor connected at a first end to the load, the second capacitor connected at a first end to the first bus, the second ends of the capacitors connected together at a node between third and fourth diodes and to the power source;
    a pair of serially connected clamping diodes attached to the first and second buses, and to the load;
    a pair of divider capacitors connected at a first end to each other and to the load, the first capacitor of the pair connected at a second end to the second bus, and the second capacitor of the pair connected at a second end at a node between the first and second diodes and to the power source.

2. The ballast according to claim 1 wherein the switching network is driven by at least one of a self-oscillating or integrated circuit arrangement.

3. A ballast, powered by a power source, to control operation of a load, the ballast comprising:
    a switching network connected to a first bus and a second bus, and configured to control a supply of power to the load;
    a bridge converter network having a first leg including first and second series connected bridge diodes, and a second leg including third and fourth series connected bridge diodes, each leg connected to the first bus and the second bus, and configured to receive an input signal from the power source and to convert the signal into a form usable by the switching network, the bridge converter network integrated with the switching network, wherein in addition to providing the usable signal to the switching network the bridge converter circuit contributes to operation of the switching network;
    a pair of serially connected clamping diodes, attached to the first and second buses, and to the load, wherein the clamping diodes, clamps a voltage at the load to a determined value;
    a first capacitor in parallel with one of the clamping diodes; and
    a second capacitor connected at one end to the load and the first capacitor, and at a second end to at least one of the first leg of the bridge converter network, and to a first side of the power source or to the second leg of the bridge converter network, and to a second side of the power source.

4. The ballast of claim 3 wherein the switching network is a two switch, switching network.

5. The ballast according to claim 3 further including a capacitor divider network including a first divider capacitor and a second divider capacitor connected together between the second leg of the bridge network and to a second side of the power source, another side of the first divider capacitor connected to the load, and a second side of the second divider capacitor connected to an input bus.

6. The ballast according to claim 3 wherein the switching network is driven by at least one of a self-oscillating or integrated circuit arrangement.

7. A ballast powered by a power source to control a load, the electronic ballast comprising:
   a series switching network connected to a first bus and a second bus;
   a bridge inverter network having a first leg including first and second series connected bridge diodes and a second leg including third and fourth series connected bridge diodes each leg connected to the first bus and the second bus;
   a first capacitor network having a first capacitor and a second capacitor, the first capacitor connected at a first end to the load, the second capacitor connected at a first end to the first bus, the second ends of the capacitors connected together at a node between third and fourth diodes and to the power source;
   a pair of serially connected clamping diodes attached to the first and second buses and to the load; and
   a second capacitor network having a first capacitor and a second capacitor, the first and second capacitors connected at a first end to each other and to the load, the first capacitor connected at a second end to the second bus, and the second capacitor connected at a second end at a node between the first and second diodes and to the power source.

8. The ballast according to claim 7 further including an emi filter configuration, connected to the power source.

9. The ballast according to claim 8 further including an energy storage capacitor connected across the first leg of the bridge diodes.

10. The ballast according to claim 9 further including a first inductor connected between the switching network and one end of the load.

11. The ballast according to claim 7 wherein the switching network is driven by at least one of a self-oscillating or integrated circuit arrangement.

* * * * *